June 16, 1936.  E. C. PUGH  2,044,185

CLEANING APPARATUS

Filed Aug. 25, 1933  2 Sheets-Sheet 1

INVENTOR
Earl C. Pugh
BY
John H. Bruninga
ATTORNEY

Patented June 16, 1936

2,044,185

UNITED STATES PATENT OFFICE 2,044,185

CLEANING APPARATUS

Earl C. Pugh, St. Louis, Mo., assignor to The Band Box Corporation, St. Louis, Mo., a corporation of Missouri Application August 25, 1933, Serial No. 686,676

6 Claims. (Cl. 210—191)

This invention relates generally to cleaning, and particularly to apparatus for reclaiming used cleaning fluids, as well as a process of operating cleansers in conjunction with the reclaiming apparatus.

In accordance with the ordinary dry cleaning practice, a suitable cleaning fluid such, for instance, as an organic solvent is employed and the articles to be cleansed may be agitated in a suitable washer or cleanser with the desired amount of such cleaning fluid. Periodically, as the cleaning fluid for a particular washer may become soiled so that its efficiency has been reduced, it has heretofore been the practice to filter the cleaning fluid so as to remove such solids as may be entrained therein. When desired suitable coagulating agents may be employed to facilitate removal of the colloidal foreign matter by filtration. It is also the practice to periodically distill the cleaning fluid which has been employed for a time sufficient to become contaminated with dissolved foreign matter such, for instance, as oils and greases not readily removable by filtration. Although the filtration and distillation of the cleaning fluid must be repeated periodically, it will be understood, of course, that the amount of cleaning done determines the frequency of such operations. As a general rule, it has heretofore been the practice to filter the cleaning fluid as often as once every two or three days, while ordinarily the fluid need not be distilled oftener than once a week, depending, of course, upon the amount of work done. Obviously, the efficiency of the cleaning fluid just prior to filtration or distillation is much lower than when the fluid is fresh and consequently it has heretofore been the practice of cleaners to employ fresh fluid for cleaning certain types of garments, for instance, white garments, while darker garments may be cleaned after the fluid has been used for a time.

Heretofore various types of filtering devices and various types of stills have been employed for reclaiming cleaning fluids. The filters employed have, as a general rule, been of a plate or bag type provided with removable filter elements, formed of a suitable material such, for instance, as heavy drill. The filter elements may, of course, be given a precoat of a suitable filter aid, but after use for a few times, it has heretofore been necessary to dismantle the filter to clean the filter elements or renew the same. Incident to such removal or such cleaning of the filter elements there has been a substantial loss of cleaning fluid due to the fact that when the filter is opened, the accumulated dirt or slush upon the filter element is saturated with cleaning fluid and consequently when the slush is removed the entrained fluid is wasted. This operation is accompanied with considerable loss of time, loss of fluid due to evaporation, disagreeable odors and is a very messy job. Under the usual routine of dry cleaning and reclaiming the fluid, the loss of fluid as just described ordinarily costs the operator about 10% of his gross sales.

An object of the present invention, generally stated, is to provide an apparatus for reclaiming dry cleaning fluids whereby the fluid loss heretofore experienced is substantially reduced.

Another object of this invention is to provide an apparatus for reclaiming dry cleaning fluids whereby the filter may be automatically cleaned as the fluid is being distilled.

A further object of this invention is to provide a dry cleaning process wherein the fluid employed in the cleaning operation is being continuously renovated and supplied fresh.

A more specific object of this invention is to provide a combined filter, still and condenser, the filter being so connected to one or more suitable cleansers that the fluid employed may be continuously circulated through the filter as the cleaning operation proceeds and the parts being so constructed and arranged that when the fluid is distilled the filter is at the same time cleaned.

Other objects will become apparent to those skilled in the art when the following description is read in connection with the accompanying drawings, in which.

Figure 1:
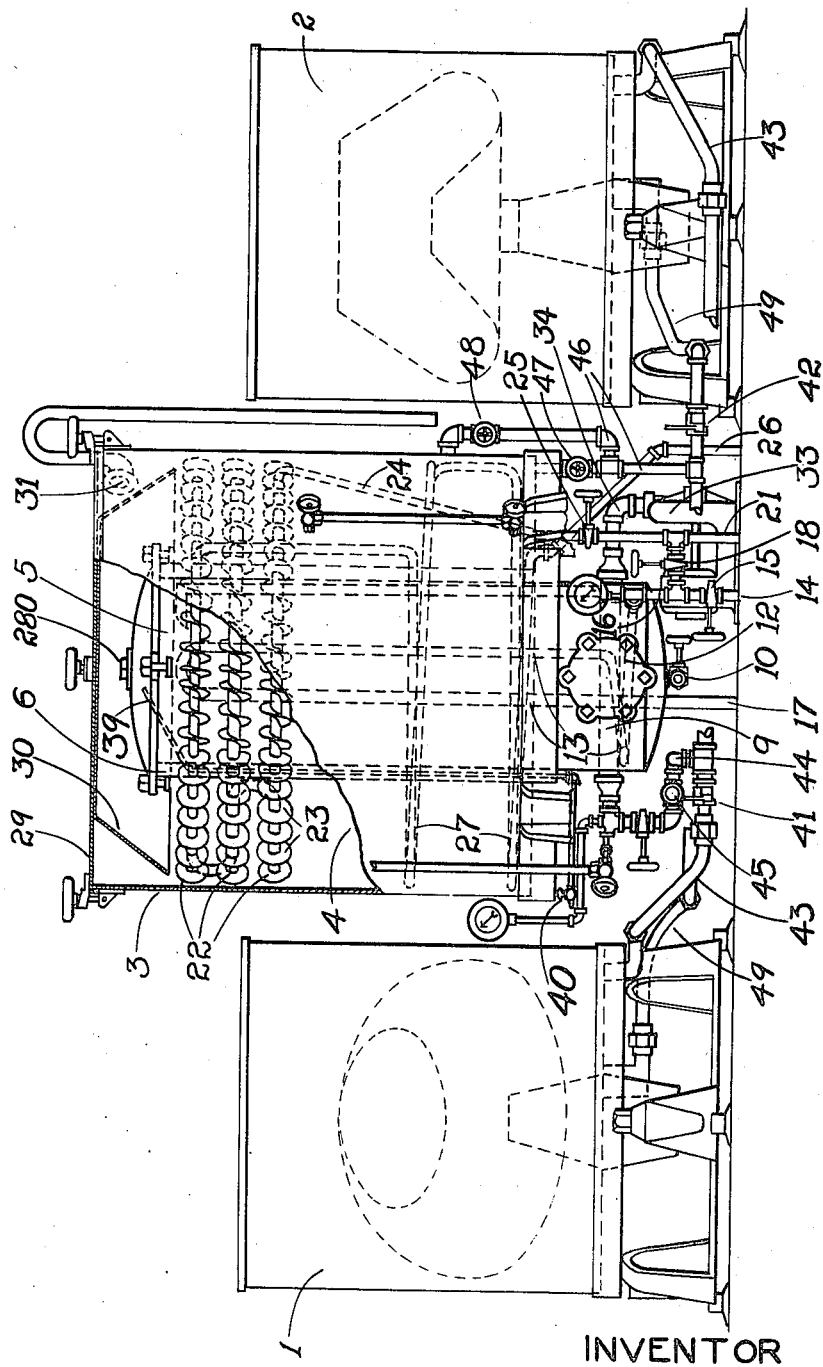
Figure 1 is a view in side elevation illustrating a plurality of cleansers associated with the combined filter and still of the present invention.

In accordance with the present invention, generally stated, a filtering device may be arranged to receive cleaning fluid from suitable cleansers and may be provided with suitable heating means in association with a suitable cooling device whereby the chamber in which the filter elements are located may serve the purpose of a still. In accordance with one embodiment of the present invention, the filtering device may be connected in circuit relation with the cleaner so that a continuous supply of fresh cleaning fluid is continuously fed from the filtering device to the cleanser during operation of the latter. When, however, the cleaning fluid becomes laden with soluble oils and greases or other minute or colloidal matter which can not be efficiently removed by the filter, the cleaning fluid may be distilled in the filter device. In order to accomplish this a suitable means of heating the filtering chamber is provided whereby the dirty fluid contained therein may be boiled in direct contact with the filtering elements. When the boiling is carried out in the presence of the filtering elements, it is apparent that the agitation due to boiling, as well as the drying of the accumulated matter upon the filtering elements will dislodge the accumulation from the filter elements and thus clean the same so as to restore their efficiency.

As an additional feature of the present invention, and particularly when the heating means employed in connection with the filtering chamber is in the nature of a coil of pipe through which steam may be passed, it becomes possible during normal operation of the filter to circulate a cooling medium such, for instance, as cold water through the same coil of pipe. By thus cooling the fluid as it is being filtered, particularly advantageous results are accomplished in view of the fact that when the temperature is maintained slightly below atmospheric there is an apparent tendency of the entrained oils and greases to become coagulated or heavy enough to be picked up by the filtering medium, thus increasing the effectiveness of the filter. Moreover, when cooled, the tendency of the fluid to vaporize into the atmosphere is reduced.

Referring now particularly to the drawings for an illustrative embodiment of the present invention, one or more cleansers of any suitable type 1 and 2 may be connected so as to receive cleaning fluid from a reclaiming device 3 constructed in accordance with the present invention. As hereinbefore pointed out, the reclaiming device 3 is in the nature of a combined filter, still and condenser, more particularly illustrated in Figure 2. In the embodiment illustrated in the drawings, the combined filter, still and condenser 3 may consist of a pair of concentrically arranged tanks 4 and 5 which may be separated by a suitable insulating medium such, for instance, as an air space 6. Within the inside tank 5 are arranged the filter elements which, as shown in the drawings, may comprise a series of ordinary filter plates 7 constructed in accordance with the usual practice and consisting of a frame over which a suitable medium such, for instance, as heavy drill is stretched. The interior of each of the frames 7 is connected through a suitable tube such as 8 to a manifold 9 so that when the fluid to be filtered is caused to pass through the filtering medium to the interior of the respective frames, it is collected in manifold 9.

Tank 5 may be formed at its bottom in the form of a sump 11 and may be provided with a suitable discharge door 12 which may be open to permit removal of the solids which have accumulated in the bottom thereof. Likewise a drain 10 may be provided.

The inside tank 5 may also be provided with a heating device which, in the embodiment illustrated, is in the form of a coil of pipe 13 extending around on the interior of tank 5, in close proximity to the walls thereof and arranged so as to be immersed in the fluid contained in the tank. Pipe 13 may be connected to a suitable source of steam supply 14 which may be controlled by a valve 15, the connection being effected through a pipe 16. The other end of coil 13 may be connected to a suitable discharge 17. Coil 13 may also be arranged to operate as a cooling device for the filter and for this purpose pipe 16 may be connected through a valve 18 and pipe 19 to a suitable source of cold water supply 21.

Figure 2:
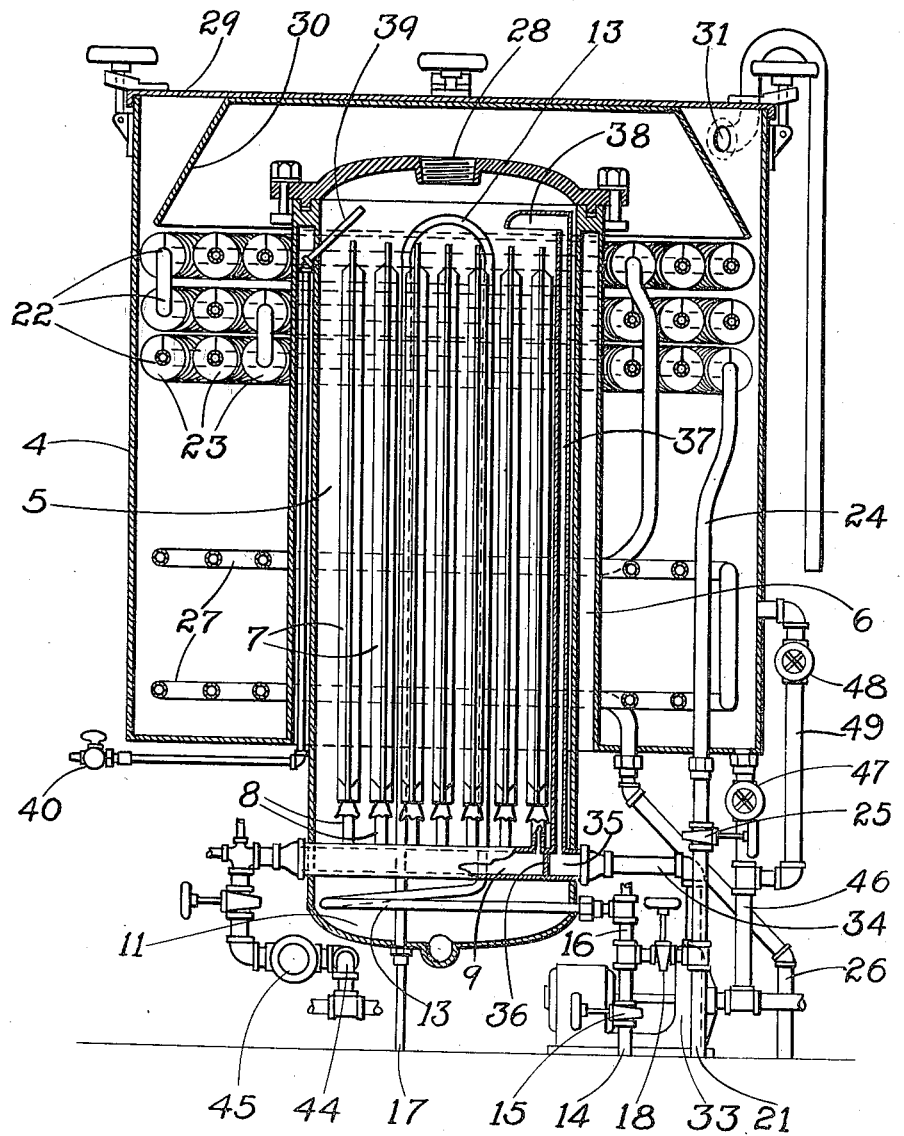
Figure 2 is a longitudinal sectional view of the combination filter, still and condenser constructed in accordance with the present invention.

As clearly shown in Figure 2, the outside tank 4 is of annular form, arranged to surround the inside tank 5 covering the same at the top. Arranged within the outside tank 4 may be a series of condensing coils 22 which in the embodiment illustrated are each provided with a multiplicity of outstanding fins 23 preferably arranged at an angle to the axis of the device so as to obstruct the passage of gases or vapors in a vertical direction through tank 4. As thus arranged, the effective heat absorbing area of coils 22 is substantially increased and gases or vapors passing vertically in tank 4 are forced to contact with some such heat absorbing area. Coils 22 may be connected as through a pipe 24, controlled by valve 25 to the source of cold water supply 21, so that cold water may be circulated through the coils and discharged as, for instance, through an opening 26.

In the lower portion of tank 4 another series of coils 27 may be provided and these may be suitably connected to the source of cold water supply so as to further cool the fluid which has been condensed with contact coils 22. Coils 27 may be connected in series with coils 22 between inlet pipe 24 and discharge pipe 26, as shown; or, if desired, they may be connected in parallel relation with coils 22.

As clearly shown in Figure 2 of the drawings there is an opening 28 provided in the top of tank 5 which forms a communication passage between the interior of tank 5 and the interior of tank 4. Opening 28 may be provided with a suitable closure 280 such, for instance as a threaded plug, as illustrated. Arranged above opening 28 and suitably secured to a lid 29 of tank 4 is a canopy 30 arranged to deflect vapors which may pass upwardly through opening 28 in a direction downwardly and against cooling coils 22 in order to condense the vapors. A suitable air vent such as 31 for tank 4 may be arranged so as to terminate above the edge of canopy 30 so as to permit the escape of air from tank 4 without permitting vapors discharged from tank 5 to escape.

During normal operation of the device, however, that is to say, during the filtering operations, it is desirable to have passage 28 closed so as to prevent the escape of vapors into tank 4.

In order to charge the fluid to be filtered or distilled into tank 5, a pump 33 may be provided adapted to receive soiled fluid from either of cleansers 1 and 2 and charge the same through pipe 34 into an isolated section 35 of manifold 9. It will be observed that manifold 9 is divided by a partition 36 so as to keep the incoming fluid separate from the filtered fluid. Leading upwardly into tank 4 from chamber 35 is a tube 37 arranged to conduct the cleaning fluid upwardly under the action of pump 33 and discharge the same at or near the top of tank 5. Arranged above the mouth of tube 37 may be a splash cap 38 to prevent fluid from escaping through passage 28 when plug 280 is removed. Also arranged within tank 5 is an air escape pipe 39, the mouth of which is disposed near the top of tank 5. Pipe 39 leads to the exterior of the device and may terminate in a suitable control cock 40.

To the fluid inlet of cleansers 1 and 2 is connected a pipe 43 which is in turn connected through a suitable pipe 44 to the end of manifold 9 so as to receive fresh filtered cleaning fluid therefrom. Arranged in pipe 44 may be a suitable sight gauge 45 through which the filtering fluid may be observed to determine its condition. In order to return the distilled cleaning fluid to the system, pipe 46 may extend from the bottom of tank 4 to the intake side of pump 33 from which the fluid may be returned to the interior of tank 5 to circulate through the system. Pipe 46 may, of course, be provided with a suitable control valve 47.

Some water will almost inevitably become entrained in the cleaning fluid and pass over with it during distillation. In order to insure complete removal of such water from tank 4, an auxiliary discharge pipe 49 controlled by valve 48 is provided for tank 4. In operation as much condensate as possible may be withdrawn through pipe 49 so that the upper layers of condensate (which contain the water) are removed first. Thereafter the remaining condensate (which is substantially free from water) may be withdrawn through valve 47.

During operation of cleansers 1 and 2, cleaning fluid may be continuously withdrawn therefrom as through pipe 49 and delivered to pump 33 for charging into the filter.

Assuming the apparatus to be in condition for cleaning and assuming that cleanser 1 is operating as a cleaner while cleanser 2 may be operating as a drier, it will be understood that the cleaning fluid will be in continuous circulation between cleanser 1, the filter and back again. In other words cleaning fluid will be continuously withdrawn from cleanser 1 through pipe 49 and charged by pump 33 through tube 37 into tank 5. Pump 33 is adapted to build up pressure sufficient to force the fluid through the filter elements 7. After passing through the filter media, the fluid is collected on the interior of manifold 9, is delivered into pipes 44 and 43 and under the pressure of pump 33 is charged into cleanser 1. During this time valve 15 is closed and valve 18 is open so as to permit cold water to circulate through tube 13 being discharged at 20. Also line valve 41 is open and line valve 42 closed.

After the cleaning operations have proceeded for such a time that the cleaning fluid becomes contaminated with minute solids which can not be removed by filtration, and laden with oils and greases which may have become dissolved in the fluid, tank 5 may be then converted into a still.

In order to place the apparatus in condition for distillation, cover 29 for tank 4 may be removed so as to permit removal of plug 280. After plug 280 is removed, it will be understood that the interior of tank 5 will be in communication with the interior of tank 4 and cover 29 may be replaced. Steam may now be admitted to coil 13 for the purpose of heating the cleaning fluid in tank 5. This is accomplished by closing valve 18 to cut off the supply of cold water and opening valve 15 to permit steam to enter coil 13. As the steam is circulated through coil 13 the temperature of the cleaning fluid in tank 5 is gradually raised until the boiling point is reached. As the cleaning fluid boils, vapors are given off, passing as indicated by the arrows in Figure 2 and traveling over into tank 4. As the vapors rise they are deflected by canopy 30 downwardly against condensing coils 22 and fins 23 thereon so as to condense the vapors. The condensate falls to the bottom of tank 4 and as the quantity increases, cooling coils 27 become surrounded and operate to further cool the condensate.

During the boiling of the cleaning fluid in tank 5, the incident agitation is effective to dislodge accumulations of foreign matter which have become deposited on the filter media. Such foreign matter as is thus dislodged falls to the bottom of tank 5 and is collected in sump 11 from which it may be removed after the distillation is complete. Moreover as the supply of undistilled cleaning fluid in tank 5 is reduced, such foreign matter as remains deposited upon the filter media is dried out or evaporated and passed over into tank 4 to be condensed by coils 22, thus eliminating any waste which might be incident to removal of the foreign matter in a moist condition.

As the cleaning fluid is being evaporated in tank 5, it will be understood, that more fluid may be supplied from cleansers 1 and 2 until finally the entire batch of cleaning fluid for the whole system is distilled and confined within tank 4 as a cooled condensate.

After the entire batch of cleaning fluid has been distilled so that the interior of tank 5 is in a substantially dry condition, the door 12 may be removed and the accumulated foreign matter in sump 11 cleaned out. Plug 280 may then be replaced in opening 28 in order to close the same. Valve 15 is then closed to cut off the supply of steam and valve 18 opened to permit circulation of cold water through coil 13 in order to cool off the parts. Valve 47 may then be opened to permit the condensed cleaning fluid in tank 4 to be charged into cleansers 1 and 2, as well as tank 5 so that the system is again placed in condition for cleaning.

From the foregoing description it is apparent that the invention accomplishes its objects and that an apparatus is provided whereby great economies are effected in reclaiming dry cleaning fluids and whereby the cleaning operation itself may be carried out in a more efficient manner than has heretofore been possible. It is apparent, however, that many modifications of the process and apparatus hereinbefore described and illustrated in the accompanying drawings will present themselves to those skilled in the art without departing from the spirit of this invention. It is to be distinctly understood, therefore, that the invention is not limited to the specific details hereinbefore described for the purpose of illustration, but that such modifications and the use of such individual features and sub-combinations of features as do not depart from the spirit of this invention are, although not specifically described herein, contemplated by and within the scope of the appended claims.

Having thus described the invention, what is claimed is:

1. Apparatus of the kind described comprising, concentrically arranged tanks having a heat insulating medium therebetween, a filter element in the inside tank adapted to be immersed in fluid, a heating device for the inside tank, and a cooling device for the outside tank.

2. Apparatus of the kind described comprising, concentrically arranged tanks having a heat insulating medium therebetween, a filter element in the inside tank adapted to be immersed in fluid, a heating device for the inside tank, a cooling device for the outside tank, said tanks having a communicating passage at the top, and means for closing said passage.

3. Apparatus of the kind described comprising, concentrically arranged tanks having a heat insulating medium therebetween, a filter element and a heating device in the inside tank, and a series of cooling coils in the outside tank said coils having fins extending outwardly therefrom to obstruct the passage of fluids through the outside tank.

4. In the art of dry cleaning the process of reclaiming fluid comprising, passing dirty fluid through a filter until the filter medium is clogged with foreign material, and boiling the fluid in contact with the clogged filter medium while the medium remains in situ.

5. In the art of dry cleaning in the process of reclaiming fluid comprising, passing used cleaning fluid through a filtering element at a temperature substantially below atmospheric until the filter medium is loaded with foreign material, and thereafter boiling the fluid surrounding the filter medium.

6. Apparatus of the kind described comprising, concentrically arranged tanks, the inside tank having an opening in the top thereof communicating with the outside tank for passing vapors from the inside tank to the outside tank, a canopy overhanging said opening, cooling means in the outside tank arranged so as to substantially close the exit from said canopy, and a vent open to the atmosphere and communicating with the interior of the outside tank above the canopy and cooling means.

EARL C. PUGH.